H. A. MEARS.
Stove-Pipe Couplings.
No. 142,254.  Patented August 26, 1873.
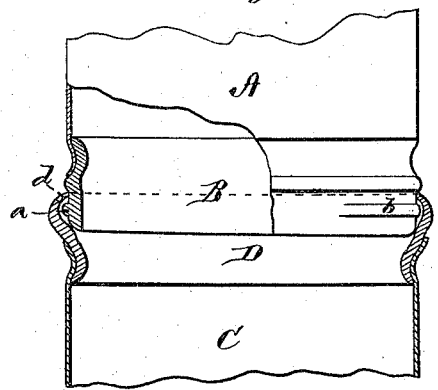
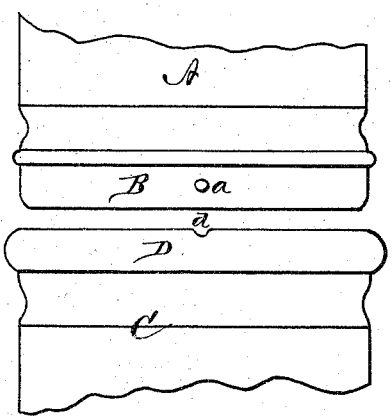
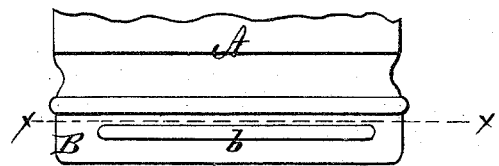
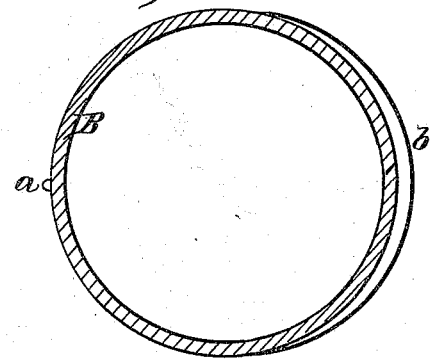
Witness:
Henry N. Miller
J. E. Beardsley
Inventor.
H. A. Mears,
By Alexander & Mason
Attorneys.

UNITED STATES PATENT OFFICE.

HORACE A. MEARS, OF PECATONICA, ILLINOIS.

IMPROVEMENT IN STOVE-PIPE COUPLINGS.

Specification forming part of Letters Patent No. 142,254, dated August 26, 1873; application filed January 24, 1873.

*To all whom it may concern:*

Be it known that I, HORACE A. MEARS, of Pecatonica, in the county of Winnebago and in the State of Illinois, have invented certain new and useful Improvements in Stove-Pipe Couplings; and do hereby declare that the following is a full, clear, and exact description thereof, reference being had to the accompanying drawings and to the letters of reference marked thereon, making a part of this specification.

The nature of my invention consists in the construction and arrangement of a coupling for stove-pipes, as will be hereinafter more fully set forth.

In order to enable others skilled in the art to which my invention appertains to make and use the same, I will now proceed to describe its construction and operation, referring to the annexed drawing, in which—

Figure 1 is a section of the coupling, showing the same uniting two pieces of stove-pipe. Fig. 2 is a side view, showing the two parts of the coupling disconnected. Fig. 3 is a side view of one part of the coupling, and Fig. 4 is a cross-section of the same taken through the line $x$ $x$.

A represents the end of a piece of stove-pipe, in which is inserted and secured a collar, B, extending a suitable distance beyond the end of the stove-pipe. The collar B is, on one side, provided with a lug, $a$, and on the opposite side is formed a tapering bead or flange, $b$, extending for a suitable distance around the outside of the collar. C represents the end of another stove-pipe, which is also provided with a collar, D, extending a suitable distance beyond its end; and this collar is provided with a circumferential groove on the inside to receive the lug $a$ and bead or flange $b$ of the collar B. On the inside, on one side of the collar D, is a recess or groove, $d$, leading from the outer edge into the above circumferential groove.

When the two pipes A and C are to be coupled, the collar B is inserted in the collar D, with the bead or flange $b$ in the circumferential groove, and the lug $a$ passing through the recess or groove $d$ also into said circumferential groove. Then, by turning either pipe in either direction, the pipes will be coupled or united together.

To take them apart or uncouple it is only necessary to turn them until the lug $a$ comes opposite the groove or recess $d$, when the collar B will readily come out of the collar D.

These collars C and D may be cast or stamped out in the desired shape.

Having thus fully described my invention, what I claim as new, and desire to secure by Letters Patent, is—

The combination, with the pipes A and C, of the collar B, provided with lug $a$ and bead or flange $b$, and the collar D, having interior circumferential groove and a recess, $d$, all substantially as and for the purposes herein set forth.

In testimony that I claim the foregoing I have hereunto set my hand this 28th day of December, 1872.

HORACE A. MEARS.

Witnesses:
　J. G. MANLOVE,
　EDWIN DAY.